(12) United States Patent
Haas

(10) Patent No.: US 11,724,270 B2
(45) Date of Patent: Aug. 15, 2023

(54) AEROSOL DEVICE AND METHOD FOR PROVIDING AN AEROSOL

(71) Applicant: Dropsa BM Germany GmbH, Frickenhausen (DE)

(72) Inventor: Reiner Haas, Metzingen (DE)

(73) Assignee: Dropsa BM Germany GmbH, Frickenhausen (DE)

( * ) Notice: Subject to any disclaimer, the term of this patent is extended or adjusted under 35 U.S.C. 154(b) by 674 days.

(21) Appl. No.: 16/699,036

(22) Filed: Nov. 28, 2019

(65) Prior Publication Data

US 2020/0094274 A1    Mar. 26, 2020

Related U.S. Application Data

(63) Continuation of application No. PCT/EP2018/063106, filed on May 18, 2018.

(30) Foreign Application Priority Data

May 30, 2017    (DE) .................... 10 2017 209 068.5

(51) Int. Cl.
| | |
|---|---|
| B05B 7/00 | (2006.01) |
| B05B 14/00 | (2018.01) |
| B05B 7/04 | (2006.01) |
| B23Q 11/10 | (2006.01) |

(52) U.S. Cl.
CPC .......... B05B 7/0012 (2013.01); B05B 7/0416 (2013.01); B05B 14/00 (2018.02); B23Q 11/1046 (2013.01)

(58) Field of Classification Search
None
See application file for complete search history.

(56) References Cited

U.S. PATENT DOCUMENTS

| | | |
|---|---|---|
| 3,515,676 A | 6/1970 | Hierta et al. |
| 4,116,387 A | 9/1978 | Kremer, Jr. et al. |
| 5,125,480 A | 6/1992 | Gregory et al. |
| 5,609,798 A | 3/1997 | Liu et al. |
| 5,610,010 A | 3/1997 | Surzycki et al. |
| 5,800,598 A | 9/1998 | Chein et al. |
| 6,290,024 B1 | 9/2001 | Ehlert et al. |
| 7,086,611 B2 | 8/2006 | Grausam |

(Continued)

FOREIGN PATENT DOCUMENTS

| | | |
|---|---|---|
| DE | 27 55 060 A1 | 6/1979 |
| DE | 101 01 889 A1 | 7/2002 |

(Continued)

*Primary Examiner* — Binu Thomas
(74) *Attorney, Agent, or Firm* — Aslan Law, P.C.

(57) ABSTRACT

In order to provide an aerosol device (100) that makes it possible to provide an aerosol having an optimised composition, in particular optimised droplet size distribution, it is proposed that the aerosol device (100) should include the following: an aerosol casing (102); one or more aerosol nozzles (104) for generating an aerosol stream from a carrier gas and a liquid, wherein the one or more aerosol nozzles (104) are directed into an interior (106) of the aerosol casing (102) and/or are arranged in the aerosol casing (102); one or more carrier duct connection points (156) for connecting one or more carrier ducts (158), by means of which the aerosol is guidable away from the interior (106) of the aerosol casing (102).

11 Claims, 8 Drawing Sheets

(56) References Cited

U.S. PATENT DOCUMENTS

| | | | |
|---|---|---|---|
| 10,252,390 B2 | 4/2019 | Aygün et al. | |
| 2002/0007706 A1* | 1/2002 | Hattori | B05B 7/0012 82/50 |
| 2004/0124265 A1 | 7/2004 | Kaelberer | |
| 2005/0017092 A1* | 1/2005 | Kinoshita | B05B 7/0012 239/428 |
| 2007/0057083 A1* | 3/2007 | Bolz | B05B 7/0012 239/398 |
| 2009/0230215 A1 | 9/2009 | Link et al. | |
| 2018/0085875 A1 | 3/2018 | Aygün et al. | |
| 2018/0085876 A1 | 3/2018 | Aygün et al. | |
| 2019/0374731 A1* | 12/2019 | Hashiba | B05B 7/0012 |

FOREIGN PATENT DOCUMENTS

| | | | |
|---|---|---|---|
| DE | 101 04 012 C2 | 5/2003 | |
| DE | 101 04 012 C2 | 5/2003 | |
| DE | 102 17 927 B4 | 5/2005 | |
| DE | 103 49 642 A1 | 5/2005 | |
| DE | 103 52 947 A1 | 6/2005 | |
| DE | 10 2009 060 454 A1 | 6/2011 | |
| DE | 20 2009 017 542 U1 | 6/2011 | |
| DE | 20 2013 103 529 U1 | 8/2013 | |
| DE | 20 2014 006 157 U1 | 12/2015 | |
| DE | 20 2015 102 484 U1 | 9/2016 | |
| DE | 10 2016 108 886 A1 | 11/2016 | |
| DE | 10 2016 108 887 A1 | 11/2016 | |
| EP | 0 608 176 A1 | 7/1994 | |
| EP | 0 941 769 A1 | 9/1999 | |
| EP | 2 338 587 A1 | 6/2011 | |
| EP | 2 574 423 A1 | 4/2013 | |
| EP | 2 574 424 B1 | 4/2013 | |
| EP | 2 839 882 A1 | 2/2015 | |
| WO | WO 03/002263 A1 | 1/2003 | |
| WO | WO 2016/180962 A1 | 11/2016 | |
| WO | WO 2016/180963 A1 | 11/2016 | |
| WO | WO-2018150593 A1 * | 8/2018 | B05B 7/02 |

* cited by examiner

AEROSOL DEVICE AND METHOD FOR PROVIDING AN AEROSOL

RELATED APPLICATION

This application is a continuation of international application No. PCT/EP2018/063106 filed on May 18, 2018, and claims the benefit of German application No. 10 2017 209 068.5 filed on May 30, 2017, which are incorporated herein by reference in their entirety and for all purposes.

FIELD OF DISCLOSURE

The present invention relates to an aerosol device and a method for providing an aerosol. Aerosol devices and method for providing aerosols are used for example in the field of tool lubrication. In particular, a use in lubrication systems, for example so-called minimum quantity lubrication systems, may be provided.

BACKGROUND

Aerosol devices and methods for providing aerosols are known for example from the following printed specifications:
DE 103 49 642 A1, DE 101 04 012 C2, DE 101 01 889 A1, DE 102 17 927 B4, DE 20 2015 102 484 U1, DE 20 2009 017 542 U1, DE 10 2009 060 454 A1, EP 2 839 882 A1, EP 2 574 424 B1, EP 2 574 423 A1, DE 20 2013 103 529 U1, EP 2 338 587 A1.

SUMMARY OF THE INVENTION

The object of the present invention is to provide an aerosol device that makes it possible to provide an aerosol having an optimised composition, in particular optimised droplet size distribution (liquid droplet size distribution, particle size distribution).

According to the invention, this object is achieved by an aerosol device according to the independent device claim.

The aerosol device preferably includes an aerosol casing.

Further, the aerosol device preferably includes one or more aerosol nozzles for generating an aerosol stream from a carrier gas and a liquid, wherein the one or more aerosol nozzles are directed into an interior of the aerosol casing and/or are arranged in the aerosol casing.

Preferably, the aerosol device includes one or more carrier duct connection points for connecting one or more carrier ducts, by means of which the aerosol is guidable away from the interior of the aerosol casing.

It may be advantageous if the aerosol device includes a separating device for separating liquid droplets from the aerosol, wherein the separating device is arranged between the one or more aerosol nozzles on the one hand and the one or more carrier ducts on the other, as seen in a direction of flow of the aerosol.

A carrier duct is in particular a conduit. For example, a carrier duct is a flexible hose.

The aerosol is configured to be carried in particular to a providing location by means of the carrier duct.

It may be favourable if a plurality of carrier ducts are provided that on the one hand are fixed to the aerosol casing and on the other end at a common providing location.

In this case, the carrier ducts may be of identical dimensions.

Preferably, however, a plurality of carrier ducts of different dimensions are provided. As a result, in particular optimised conveying of the aerosol with different droplet size distributions, volumetric flows and/or mass flows may be produced.

Preferably, the separating device includes a centrifugal separator and/or a deflecting separator.

The separating device is in particular size-selective, for example such that, in relation to a droplet size distribution of the liquid in the aerosol, relatively large liquid droplets are separated off and comparatively small liquid droplets are carried onward in the carrier gas.

Preferably, liquid droplets are separated off at an outer wall of the aerosol casing.

It may be favourable if the interior of the aerosol casing takes an at least approximately rotationally symmetrical form.

As an alternative or in addition thereto, it may be provided for one or more aerosol nozzles to be directed at least approximately tangentially into the interior such that in particular an aerosol gas stream that rotates in a ring or a spiral or a helix is producible in the interior of the aerosol casing.

It is preferably possible to produce separation at the outer wall of the aerosol casing in that, because of the centrifugal force occurring, relatively heavy liquid droplets are conveyed radially outward and ultimately adhere to the outer wall.

Preferably, the interior of the aerosol casing includes an annular flow region and a central region.

The annular flow region is in particular the region in which there is formed the aerosol gas stream that rotates in a ring or a spiral or helically.

Preferably, the annular flow region surrounds the central region, substantially in a ring.

One or more aerosol nozzles are preferably directed into the annular flow region.

The one or more carrier duct connection points preferably directly adjoin the central region.

In this way, aerosol is preferably removable from the interior of the aerosol casing directly out of the central region.

The annular flow region and the central region are preferably spatially divided from one another by a dividing wall.

In particular, the dividing wall takes a form that is substantially in the shape of a hollow cylinder, for example being in the shape of a hollow circular cylinder.

The dividing wall is preferably fixed to the aerosol casing.

In particular, the dividing wall is fixed to a top wall of the aerosol casing and extends downward from the top wall, as seen in the direction of gravity.

A connection between the top wall and the dividing wall, in the region of the top wall, is preferably fluid-impermeable.

Preferably, the dividing wall projects freely into the interior of the aerosol casing, such that the dividing wall is configured to be flowed around in particular at a lower end of the dividing wall, as seen in the direction of gravity.

The dividing wall preferably surrounds the central region and is surrounded by the annular flow region.

It may be favourable if the dividing wall, an outer wall of the aerosol casing, a supply device (to be described below) and/or an aerosol chamber base (to be described below) are arranged and/or take a form such that they are concentric and/or coaxial in relation to a longitudinal centre plane of the casing.

One or more carrier duct connection points are preferably arranged and/or formed in the top wall of the aerosol casing.

One or more carrier duct connection points are in particular arranged and/or formed at an upper end portion of the central region.

It may be provided for one or more outlet connectors, which are in particular a constituent part of the one or more carrier duct connection points, to project into the interior, preferably into the central region of the interior.

One or more outlet openings are preferably arranged and/or formed in the top wall of the aerosol casing.

One or more outlet openings are in particular arranged and/or formed at an upper end portion of the central region.

It may be provided for one or more outlet openings that are adjoined in particular by one or more carrier duct connection points and/or one or more carrier ducts to adjoin a top wall of the aerosol casing, flush and/or without an edge and/or with a smooth transition, and/or to be integrated in the top wall of the aerosol casing and/or to adjoin a dividing wall of the aerosol casing and/or to be integrated into the dividing wall of the aerosol casing.

Preferably, the outlet openings each include a funnel-like inflow region, or are each formed, at least in certain regions, as a funnel-like inflow region.

In particular, the outlet openings are formed by a separate component that is connected for example to the aerosol casing, in particular the top wall, and/or is fixed to the aerosol casing, in particular the top wall.

The separate component is in particular formed in one piece.

The separate component is in particular a removal element.

It may be favourable if the removal element is a substantially cylindrical element that has in particular one, two, three, four or more than four outlet openings.

Preferably, the removal element has an inflow side which, in the assembled condition of the removal element, faces the interior of the aerosol casing.

The inflow side may be provided for example with a recess, in particular a recess in the shape of a sphere segment or a sphere portion.

Preferably, one or more removal regions, in particular funnel-like removal regions, of the outlet openings are arranged in this recess.

On an opposite side of the removal element to the recess and/or on a side that is remote from the interior and/or a side that faces the top wall, there are preferably arranged and/or formed one or more carrier duct connection points and/or securing points for securing the removal element.

The removal element may in particular be fixed to the top wall by means of a screw connection.

Preferably, the removal element includes a receiving region for receiving and/or fixing and/or arranging the dividing wall.

In one embodiment of the invention, it may be provided for the aerosol device to include a supply device for supplying an additive, in particular a liquid, to the interior of the aerosol casing.

The supply device is in particular a device other than the one or more aerosol nozzles.

For example, it may be provided for the supply device to include, or to be formed by, an additional aerosol nozzle and/or a spray nozzle for spraying a liquid and/or a drop generator for the purpose of introducing liquid drops.

Preferably, an additive, in particular a liquid, is suppliable to the aerosol by means of the supply device, outside the annular flow region and/or downstream of the separating device as seen in a direction of flow of the aerosol.

The supply device is preferably arranged directly below a central region of the interior of the aerosol casing, as seen in the direction of gravity, and/or directed into the central region.

In particular, liquid drops are suppliable to the aerosol by means of the supply device, wherein the liquid drops are dimensioned to be larger than the liquid droplets still remaining in the aerosol downstream of the separating device, for example by a factor of at least approximately 5, in particular at least approximately 10, for example at least approximately 50.

Preferably, the aerosol casing includes an aerosol region, in which the aerosol is guided, and a collecting region, in which liquid separated off from the aerosol is collected. In particular, the collecting region is arranged directly below the aerosol region.

Preferably, an aerosol chamber base divides the aerosol region from the collecting region.

In an edge region of the aerosol base, adjoining the outer wall, there is preferably provided an opening, in particular an annular opening, such that liquid that is separated off in the aerosol region can flow down into the collecting region.

The aerosol chamber base is arranged and/or formed for example in the shape of a cone or the outer surface of a cone.

The aerosol chamber base is preferably shaped such that it generates and/or strengthens a cyclonic action within the aerosol casing.

It may be advantageous if the supply device is arranged in the aerosol chamber base.

It may be favourable if the aerosol device includes a plurality of carrier duct connection points and/or carrier ducts that have mutually different diameters, such that different aerosol variants having different droplet size distributions of the aerosol are configured to be guided away and/or carried in particular with as little adverse effect as possible, in particular selectively.

The phrase "with as little adverse effect as possible" should be understood to mean in particular that the droplet size distribution of the aerosol at a starting region of the carrier ducts, facing the aerosol casing, corresponds at least approximately to a droplet size distribution of the aerosol at an end of the carrier ducts that is remote from the aerosol casing. Here, the phrase "at least approximately" means a deviation of at most about 20%, for example at most about 10%, of the values relevant to the droplet size distribution.

It may be favourable if the aerosol device includes a control device by means of which a droplet size distribution and/or a volumetric flow of the generated and/or provided aerosol is adjustable in targeted manner.

For this purpose, in particular the control device is configured to influence the one or more aerosol nozzles and/or the supply device for supplying the additive, in particular the liquid.

For example, by means of the control device an aerosol can be generated in targeted manner using the one or more aerosol nozzles, and optimised in terms of droplet size distribution by a targeted supply of the additive using the supply device.

By a suitable selection of the carrier ducts for supplying the aerosol generated in this way to a providing location, by means of the control device it is moreover preferably possible to ensure that the aerosol generated in the aerosol casing reaches the providing location in a composition that is unchanged as far as possible.

By means of the control device, the aerosol is preferably adjustable, in particular being controllable by closed and/or open loop control, in terms of its droplet size distribution and/or the volumetric flow, by:

varying the volumetric flows and/or the pressures of the carrier gas or the liquid for the one or more aerosol nozzles; and/or varying a volumetric flow and/or a pressure of an additional gas stream that is introduced into the interior, in addition to the carrier gas; and/or varying a volumetric flow and/or a pressure of an additive, in particular liquid, that is additionally supplied by way of a supply device; and/or selecting individual or a plurality of carrier duct connection points and/or carrier ducts for guiding away the aerosol.

One or more carrier ducts, the aerosol casing, in particular an outer wall and/or the dividing wall and/or the aerosol chamber base, and/or the supply device and/or the one or more aerosol nozzles are preferably configured to undergo temperature control, for example being coolable or heatable. As a result, in selective manner the carrier gas and/or the liquid and/or the additive and/or the aerosol may preferably undergo temperature control, in particular being cooled or heated.

As the additive that is suppliable by means of the supply device, it is possible to provide on the one hand the liquid used for generating the aerosol using the one or more aerosol nozzles.

A liquid of this kind is in particular a lubricant, for example oil.

As an alternative or in addition thereto, it may be provided for the additive to include or be formed from a gas, in particular air, nitrogen or carbon dioxide ($CO_2$).

Moreover, it may be provided for the additive to be liquid or solid; as a result the additive may for example be used for cooling the aerosol. The additive is for example liquid nitrogen or carbon dioxide ($CO_2$) in the solid aggregate state (so-called $CO_2$ snow).

A pressure in the interior of the aerosol casing may be adjusted and/or controlled by closed and/or open loop control, preferably by means of the control device. In particular, pressure may be varied for the purpose of adjustment, setting and/or open loop control of the quantity of aerosol, the droplet size distribution, the aerosol mass flow and/or the aerosol volumetric flow.

The pressure in the interior of the aerosol casing is in particular before and/or during the generation of aerosol and/or before and/or during the providing of aerosol for example at least approximately 10 bar, in particular at least approximately 15 bar, preferably at least approximately 20 bar.

As an alternative or in addition thereto, it may be provided for the pressure in the interior of the aerosol casing to be in particular before and/or during the generation of aerosol and/or before and/or during the providing of aerosol for example at most approximately 35 bar, in particular at most approximately 30 bar, preferably at most approximately 25 bar.

In particular, it is possible to perform operation of the aerosol device in a pressure range between approximately 10 bar and approximately 25 bar.

For the purpose of generating pressure, in a particularly suitable manner compressed and/or pressurised gas, in particular carrier gas, for example atomising air, may be supplied to the interior of the aerosol casing.

The aerosol, which is in particular producible using the aerosol nozzles and is obtainable after flow through the separating device, preferably has a droplet size distribution in which the most frequently occurring droplet size is preferably less than 10 µm, in particular less than 5 µm, for example less than 1 µm.

These droplets have to be distinguished from in particular liquid drops, which are for example producible using the supply device. Liquid drops preferably have a droplet size distribution in which the most frequently occurring droplet size is greater than 20 µm, in particular greater than 50 µm, preferably greater than 100 µm.

For example, liquid drops supplied by means of the supply device preferably form wall-supported liquid, in particular wall-supported oil, which is guided, in particular flowing, along the walls in the carrier ducts.

The droplets in the aerosol are preferably carried along with the carrier gas and do not come into contact with a wall of the carrier duct.

The aerosol device according to the invention is in particular suitable for use in a minimum quantity lubrication system.

A minimum quantity lubrication system of this kind may be used in particular in a machine tool.

For this reason, the present invention also relates to a minimum quantity lubrication system and to a machine tool that includes a minimum quantity lubrication system of this kind.

Further, the present invention relates to a method for providing an aerosol.

In this respect, the object of the invention is to provide an aerosol having an optimised composition.

According to the invention, this object is achieved by a method according to the independent method claim.

The method according to the invention preferably includes the following:

generating an aerosol using one or more aerosol nozzles, wherein the aerosol flows into an interior of an aerosol casing;

separating liquid droplets from the aerosol by means of a separating device arranged in the interior of the aerosol casing;

guiding the aerosol away from the interior by way of one or more carrier duct connection points for connecting one or more carrier ducts.

It may be favourable if the aerosol, for the purpose of separating off liquid droplets, is first guided in an annular stream or spiral stream or helical stream, then diverted into a central region of the interior that is arranged inside the annular stream or spiral stream or helical stream, and finally supplied to the one or more carrier duct connection points. The diversion is performed in particular at a lower end of the dividing wall, as seen in the direction of gravity.

It may be favourable if an additive, in particular a liquid, is supplied to the aerosol that is guided in the interior of the aerosol casing, in particular in a central region of the interior of the aerosol casing.

In particular, the additive is supplied to the aerosol such that a median value of the droplet size distribution of the additive is at least one order of magnitude greater than the median value of the droplet size distribution of the aerosol.

The aerosol guided away from the interior of the aerosol casing preferably includes on the one hand liquid droplets that have been generated using the one or more aerosol nozzles and on the other liquid drops that have been generated using the supply device.

An average diameter of the liquid drops is preferably at least approximately 10 times, in particular at least approximately 50 times, an average diameter of the liquid droplets.

The liquid drops are preferably introduced into the interior such that they are guided, together with the aerosol or merely by means of carrier gas, to the one or more carrier duct connection points and finally to the carrier ducts.

In the method according to the invention, it is preferably provided for the droplet size distribution of the aerosol to be selectively varied by means of a control device, in particular by:

a) varying the volumetric flows and/or pressures of the carrier gas and/or the liquid for the one or more aerosol nozzles; and/or
b) varying a volumetric flow and/or pressure of an additional gas stream that is introduced into the interior in addition to the carrier gas; and/or
c) varying a volumetric flow and/or pressure of an additive, in particular liquid, that is additionally supplied by way of a supply device; and/or
d) selecting individual or a plurality of carrier duct connection points and/or carrier ducts for guiding away the aerosol.

The aerosol is preferably provided at a providing location.

The providing location is preferably arranged at a common end of a plurality of carrier ducts.

Depending on a desired liquid volumetric flow and/or liquid mass flow and/or aerosol volumetric flow and/or aerosol mass flow, and/or depending on a desired droplet size distribution of the aerosol, preferably different numbers of carrier ducts and/or differently sized carrier ducts are used for providing the aerosol at the providing location.

The carrier ducts connect the interior of the aerosol casing to the providing location, preferably all at the same time or at least a plurality at the same time. Thus, for the purpose of selecting one or more carrier ducts for providing an aerosol of a desired droplet size distribution, there is preferably no need to replace a carrier duct or to add or remove a carrier duct. Preferably, it is simply possible—for example using a valve device—to switch between individual carrier ducts and/or pluralities of carrier ducts and selectively between individual ones of the carrier ducts.

For example, it may be provided, in an operation of the aerosol device in which there is a requirement for a large quantity of lubricant, which is provided in particular by way of a large quantity of supplied additive, for one or more carrier ducts to be used for providing the lubricant at the providing location. If a significantly smaller quantity of lubricant is briefly required, then it is preferably possible to switch to one or more other carrier ducts, in particular in order to suppress further conveying of the liquid droplets and/or liquid drops that are conveyed in the one or more carrier ducts.

In particular, undesired subsequent delivery of large liquid drops, in particular wall-supported oil, at the providing location can be avoided by switching to another carrier duct or a plurality of other carrier ducts.

The aerosol device according to the invention is in particular a so-called one-channel system, in which carrier gas on the one hand and liquid—in particular in the form of liquid droplets—on the other are conveyed from the aerosol device together and so are not separated in terms of material.

The aerosol device is particularly suitable for use in cutting machine tools.

In the present document, the term "aerosol" should preferably be understood as a mixture of substances that includes a gas, in particular a carrier gas, and liquid droplets, in particular oil droplets. Preferably, suspension time of the liquid droplets is at least approximately 5 seconds, for example at least approximately 10 seconds, preferably at least approximately 15 seconds.

Preferably, a rate of conveying of the aerosol in the carrier ducts is at most approximately 50 m/s, in particular at most approximately 40 m/s, preferably at most approximately 30 m/s.

In particular when large quantities of liquid, in particular quantities of lubricant, are to be provided, this may be done by supplying liquid that has been introduced into the interior of the aerosol casing for example exclusively by way of the supply device. For the purpose of conveying the liquid rapidly, it is then possible for example to provide a conveying rate of at least approximately 60 m/s, preferably at least approximately 80 m/s, in particular at least approximately 100 m/s.

Preferably, it is possible to switch between a) a purely aerosol mode, with no additive supplied, b) a purely additive mode, and c) a mixed mode in which both aerosol and additive are supplied.

For example, it may be provided for the one or more aerosol nozzles on the one hand and the supply device on the other to be switchable on and off separately from one another.

In particular, the one or more aerosol nozzles on the one hand and the supply device on the other are switchable on or off selectively, individually or indeed together.

Preferably, control of a plurality of aerosol nozzles is performed using a plurality of valves.

Preferably, a plurality of valves are provided that control different numbers of aerosol nozzles.

Preferably, all the aerosol nozzles are optimised for minimal consumption of carrier gas and also for optimisation of the aerosol composition, in particular the droplet size distribution, in particular in order to generate maximum aerosol density.

By targeted switching on or off of individual or a plurality of aerosol nozzles, the aerosol device can selectively generate different aerosol volumetric flows and/or aerosol mass flows for one or more providing locations, in particular without impairing aerosol quality, in particular droplet size distribution.

Preferably, the aerosol device includes a separating device that includes in particular one or more through-flow elements.

A through-flow element is in particular an object through which aerosol flows during operation of the aerosol device.

As a result of the through flow, preferably a separation and/or a size selection is produced, for the purpose of influencing the (liquid) droplet size distribution.

A through-flow element may be, for example, a perforated plate element.

In particular, a plurality of perforated plate elements are provided, arranged in a cascade, and are configured such that aerosol flows through them in particular successively.

As an alternative or in addition thereto, it is possible to obtain a diversion of flow using one or more through-flow elements.

A perforated plate element may for example take a form that is substantially in the shape of a truncated cone or a cone.

Preferably, a perforated plate element is a perforated metal sheet.

As an alternative or in addition thereto, it may be provided for a through-flow element to form or include a brush-type separator.

A brush-type separator includes in particular a multiplicity of bristles and/or projections, for example rod-shaped projections, around which aerosol flows during operation of the aerosol device, in particular for the purpose of influencing a (liquid) droplet size distribution.

One or more flow-through elements are in particular arranged in a chamber region, in particular a central region, surrounded by the dividing wall.

Preferably, the dividing wall surrounds the one or more flow-through elements substantially in the shape of a ring and/or a cylinder.

Further preferred features and/or advantages of the invention form the subject-matter of the description below and the representation in the drawings of an exemplary embodiment.

BRIEF DESCRIPTION OF THE DRAWINGS

Like or functionally equivalent elements are provided with the same reference numerals in all the Figures.

DETAILED DESCRIPTION OF THE DRAWINGS

Figure 1:
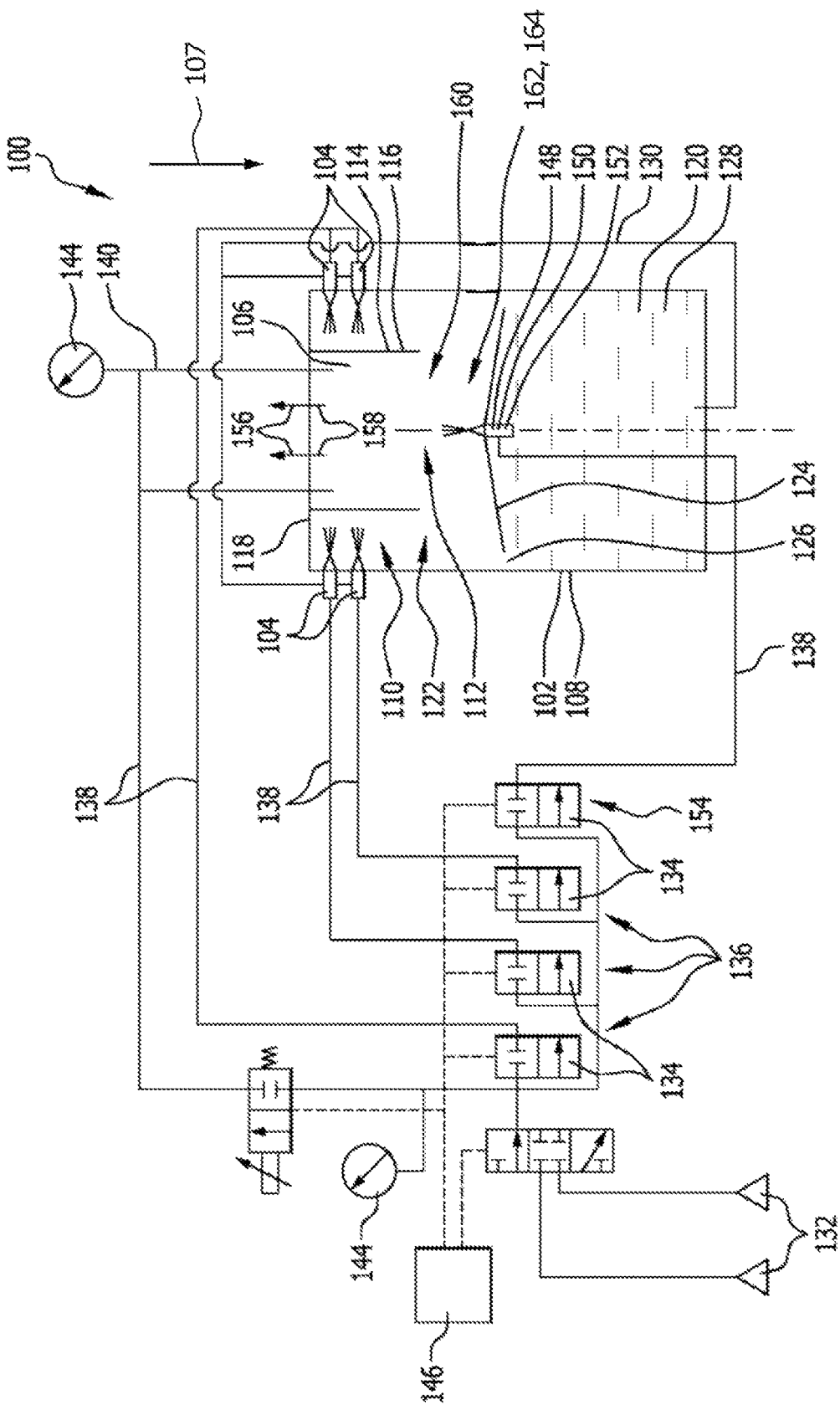
FIG. 1 shows a schematic illustration of an aerosol device.
Figure 2:
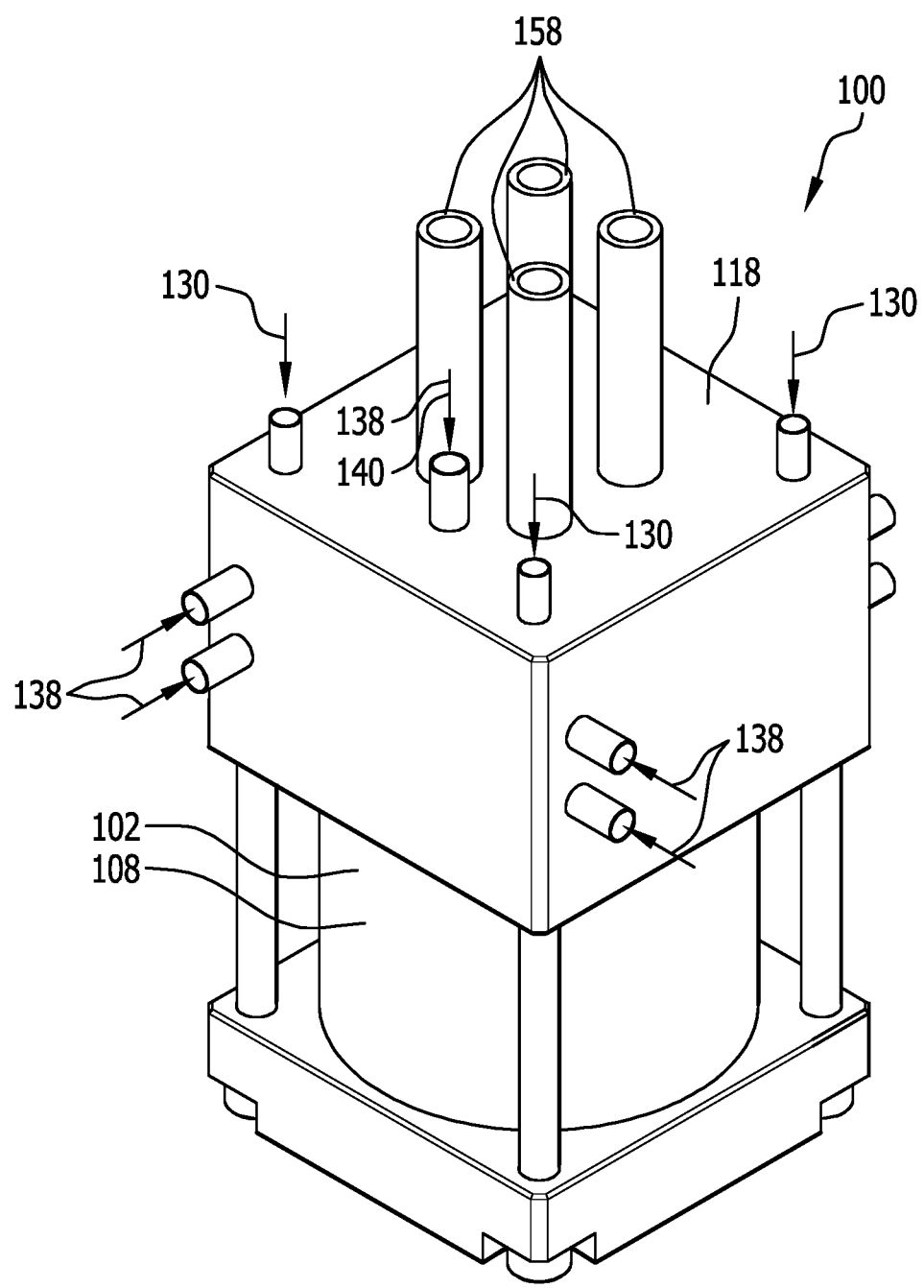
FIG. 2 shows a schematic perspective illustration of an aerosol casing of the aerosol device from FIG. 1.
Figure 3:
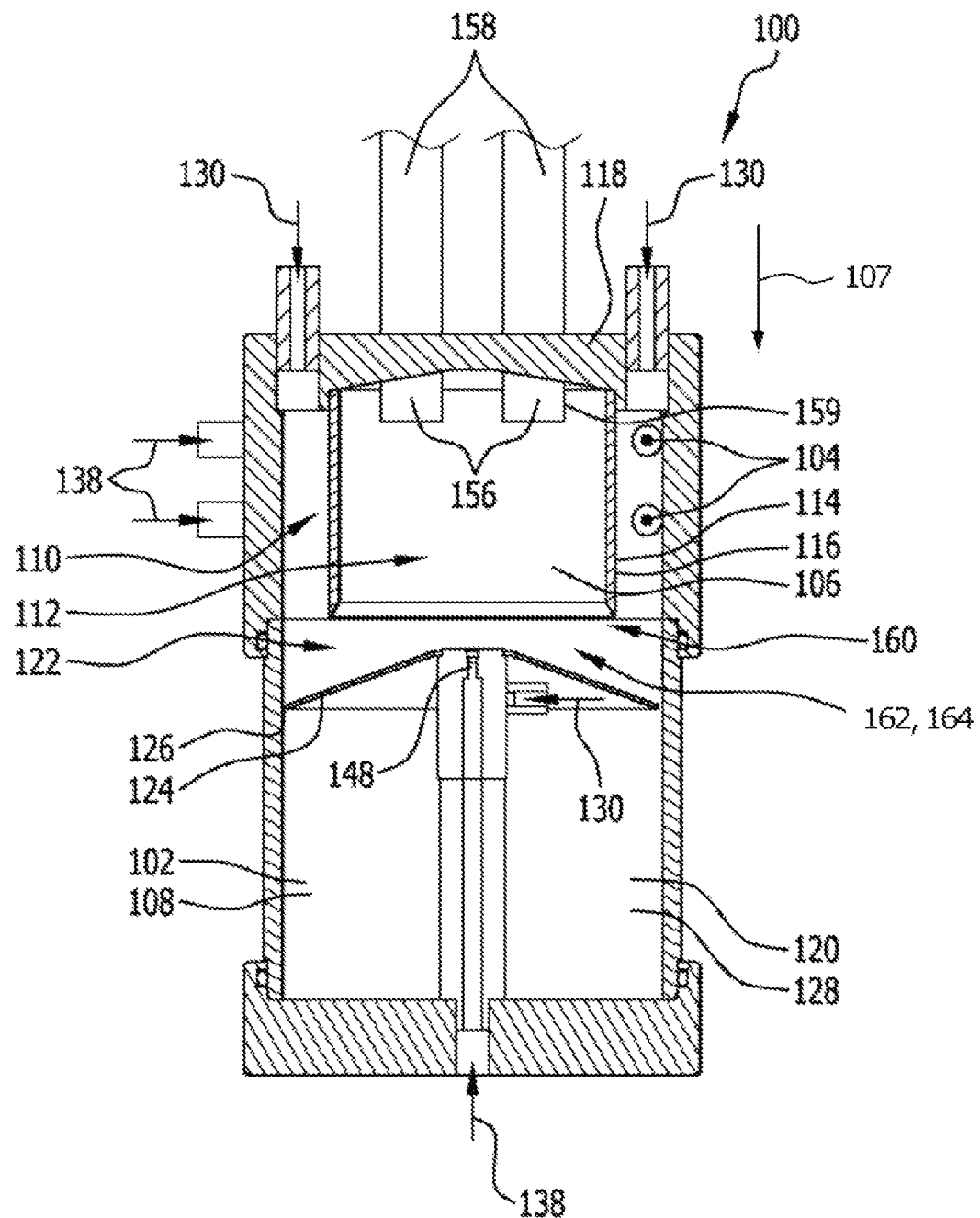
FIG. 3 shows a schematic vertical longitudinal section through the aerosol casing from FIG. 2.

An embodiment, illustrated in FIGS. 1 to 5, of an aerosol device, which is designated 100 as a whole, is for example a constituent part of a minimum quantity lubrication system for the lubrication of tools.

The aerosol device 100 may for example be provided as a constituent part of a machine tool.

The aerosol device 100 includes an aerosol casing 102 in which an aerosol that is to be provided is generated.

The aerosol device 100 further includes a plurality of aerosol nozzles 104 that are directed into an interior 106 of the aerosol casing 102.

Here, the aerosol nozzles 104 are arranged in particular in an upper region of the aerosol casing 102, as seen in the direction of gravity 107.

Figure 5:
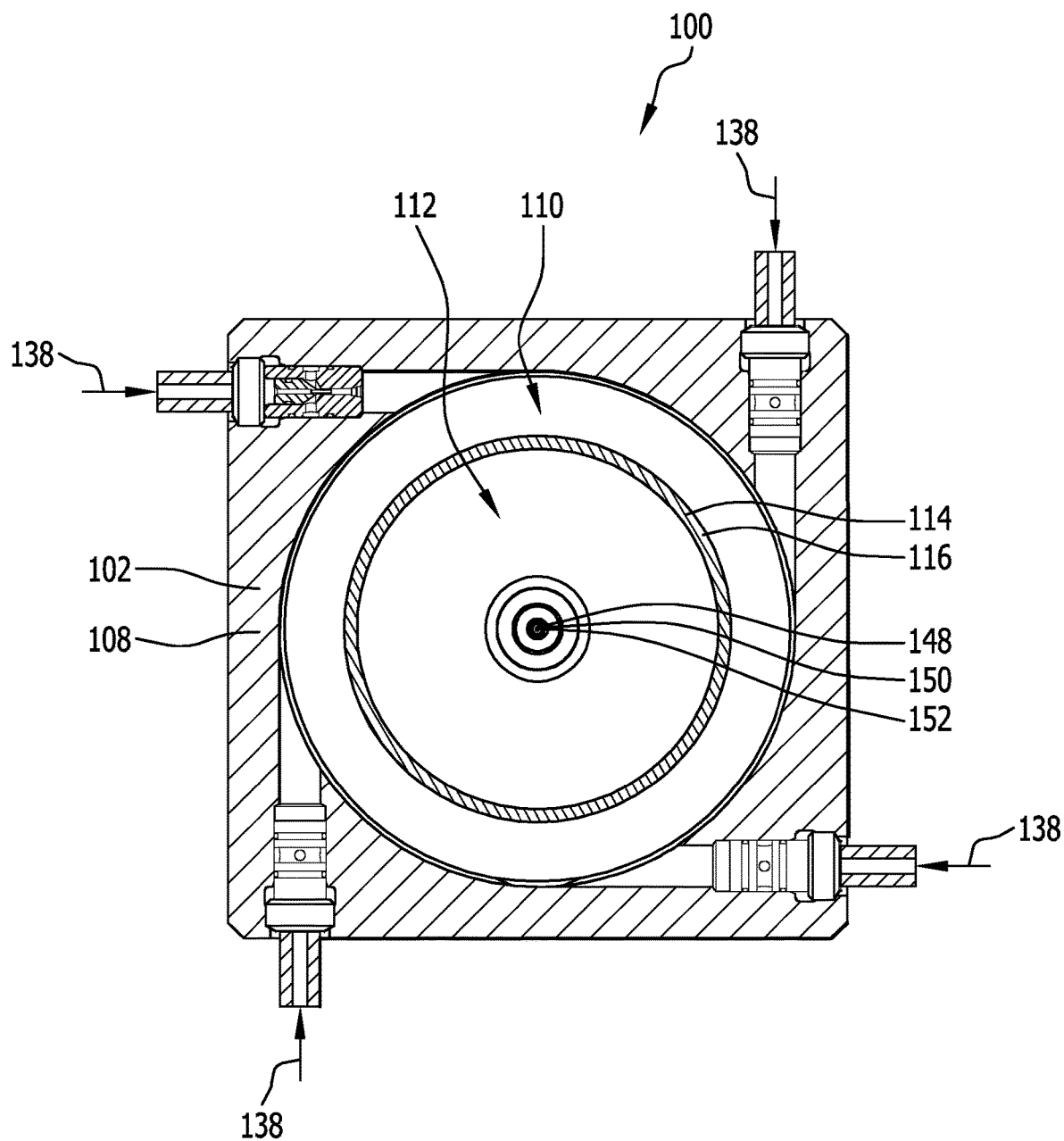
FIG. 5 shows a schematic horizontal section through the aerosol casing from FIG. 2.

As can be seen in particular from FIG. 5, the aerosol nozzles 104 are arranged substantially tangentially to an outer wall 108 of the aerosol casing 102.

The aerosol nozzles 104 thus enable in particular annular flow to be formed within the interior 106 of the aerosol casing 102.

The interior 106 of the aerosol casing 102 is subdivided into a plurality of regions.

In particular, the interior 106 includes an annular flow region 110 into which the aerosol nozzles 104 are discharged.

The annular flow region 110 surrounds a central region 112 of the interior 106.

In particular, the annular flow region 110 and the central region 112 are divided from one another by a dividing wall 114.

The dividing wall 114 is in particular a dividing cylinder 116.

The dividing wall 114 is arranged in particular on a top wall 118 of the aerosol casing 102 and extends downwards from the top wall 118, as seen in the direction of gravity.

The interior 106 of the aerosol casing 102 further includes a collecting region 120 in which liquid, in particular oil, that is separated off from the aerosol can collect.

The annular flow region 110 and the central region 112 are preferably a constituent part of an aerosol chamber or aerosol region 122 of the interior 106.

The aerosol region 122 and the collecting region 120 are divided from one another in particular by an aerosol chamber base 124.

The aerosol chamber base 124 is in particular a horizontal dividing wall that upwardly delimits the collecting region 120.

The aerosol chamber base 124 is in particular permeable, such that liquid separated off in the aerosol region 122 can pass downwards into the collecting region 120.

For example, an annular gap is formed between the outer wall 108 of the aerosol casing 102 and the aerosol chamber base 124.

The annular gap is in particular a drainage gap 126.

The collecting region 120 in particular forms a liquid reservoir 128. Liquid is supplied to the aerosol nozzles 104 from the liquid reservoir 128, in particular by way of one or more liquid conduits 130.

Further, the aerosol device 100 preferably includes a carrier gas source 132 by means of which a carrier gas, in particular compressed air, is provided.

One or more valve devices 134 serve to supply the carrier gas to the aerosol nozzles 104.

These valve devices 134 are in particular aerosol valves 136.

The connections between the aerosol valves 136 and the aerosol nozzles 104 are formed in particular by gas conduits 138.

Further, an additive gas supply line 140 of the aerosol device 100 may be provided.

The additive gas supply line 140 in particular enables the supply of additional carrier gas from the carrier gas source 132 to the central region 112 of the interior 106.

For the purpose of varying a volumetric flow of the carrier gas supplied by way of the additive gas supply line 140, in particular a proportional valve 142 may be provided in a gas conduit 138 of the additive gas supply line 140.

Finally, one or more manometers 144 also serve to monitor and/or control the aerosol device 100.

Moreover, the aerosol device 100 preferably includes a control device 146 by means of which in particular the entire aerosol device 100 is controllable by closed and/or open loop control.

The aerosol device 100 moreover preferably includes a supply device 148 for supplying an additive to the aerosol generated in the aerosol casing 102.

The supply device 148 is in particular arranged in the aerosol chamber base 124 and/or directed into the central region 112 of the interior 106.

The supply device 148 preferably includes an aerosol nozzle 150 and/or a spray nozzle 152.

By means of an aerosol nozzle 150, it is in particular possible to meter a finely misted liquid into the central region 112 and the aerosol therein.

By means of the spray nozzle 152, it is preferably possible to introduce a liquid in drop form, having drop sizes that are large by comparison with the aerosol, into the central region 112 and the aerosol and/or carrier gas guided therein.

By means of a valve device 134 taking the form of a wall-supported oil valve 154, the quantity of additive supplied by way of the supply device 148 may preferably be controlled by closed and/or open loop control. Further, preferably a droplet size of an aerosol or spray supplied by way of the supply device 148 is adjustable in this way.

Further, the aerosol device 100 includes one or more carrier duct connection points 156 for connecting one or more carrier ducts 158.

In particular, the aerosol generated in the interior 106 of the aerosol casing 102 can be guided away by way of these carrier duct connection points 156 and the carrier ducts 158, and supplied to a providing location (not illustrated).

Figure 4:
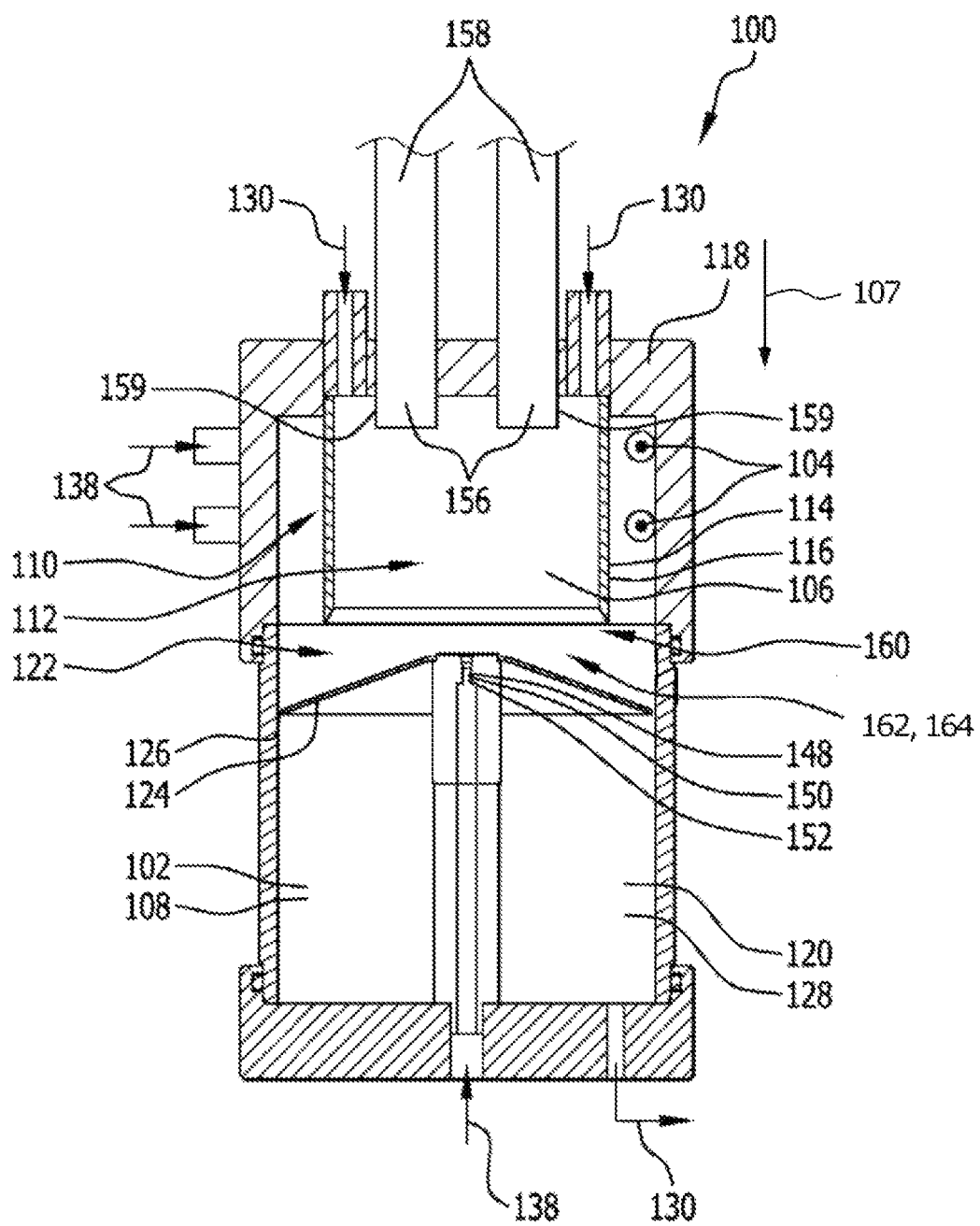
FIG. 4 shows a further schematic vertical longitudinal section through the aerosol casing from FIG. 2.

As can be seen in particular from FIG. 4, the carrier duct connection points 156 and/or the carrier ducts 158 may have one or more outlet connectors 159 that in particular project into the interior 106 of the aerosol casing 102.

As a result, aerosol can in particular be directly received in and guided away from the central region 112.

The embodiment of the aerosol device 100 illustrated in FIGS. 1 to 5 functions as follows:

An aerosol is generated using the aerosol nozzles 104 from a carrier gas and a liquid, in particular oil, and is introduced into the annular flow region 110 of the interior 106 of the aerosol casing 102.

As a result of the tangential arrangement and/or orientation of the aerosol nozzles 104, preferably an annular or helical or spiral aerosol stream is produced in the annular flow region 110.

Here, the aerosol flows in particular around the dividing wall 114 and down, as seen in the direction of gravity.

Because of the flow that is established, a centrifugal force is produced, and this forces the relatively large droplets in the aerosol radially outwards until they come into contact with the outer wall 108 and are separated off there.

The separated-off liquid then flows along the outer wall 108, through the drainage gap 126 and into the collecting region 120.

Then, a proportion of the droplets of relatively small diameter remains in the aerosol.

This aerosol then flows through under the dividing wall 114 and into the central region 112.

During this, an additive is supplied to the aerosol by way of the supply device 148.

This additive is in particular the same liquid as that already used in the aerosol nozzles 104 to generate the aerosol.

During this, however, the supply device 148 preferably generates drops of comparatively large diameter. In particular, the drops generated by the supply device 148 are larger than the liquid droplets of aerosol first generated by the aerosol nozzles 104 and separated off at the outer wall 108.

The aerosol device 100 thus includes a separating device 160, which takes the form in particular of a centrifugal separator 162 and/or a deflecting separator 164, in order to separate off liquid droplets first generated by the aerosol nozzles 104 that are in an undesirable size range.

Then, the supply device 148 is used to supply for example liquid drops that are preferably larger, in particular at least an order of magnitude larger, than the liquid droplets separated off by the separating device 160.

It is thus possible, using the combination of aerosol nozzles 104 and supply device 148, to generate a very specific droplet size distribution in the central region 112.

Here, the aerosol nozzles 104 and the supply device 148 are switchable on and/or off, selectively alternately or together, in order ultimately to be able selectively to generate different droplet size distributions in the central region 112.

Finally, the aerosol in the central region 112 may be guided, by way of the carrier duct connection points 156 and the carrier ducts 158, to one or more providing locations.

In particular if differently sized carrier ducts 158 are provided, this carrying of the aerosol to the providing location may be adapted to the droplet size distribution in order ultimately to ensure a desired aerosol composition at the providing location as well.

Figure 6:
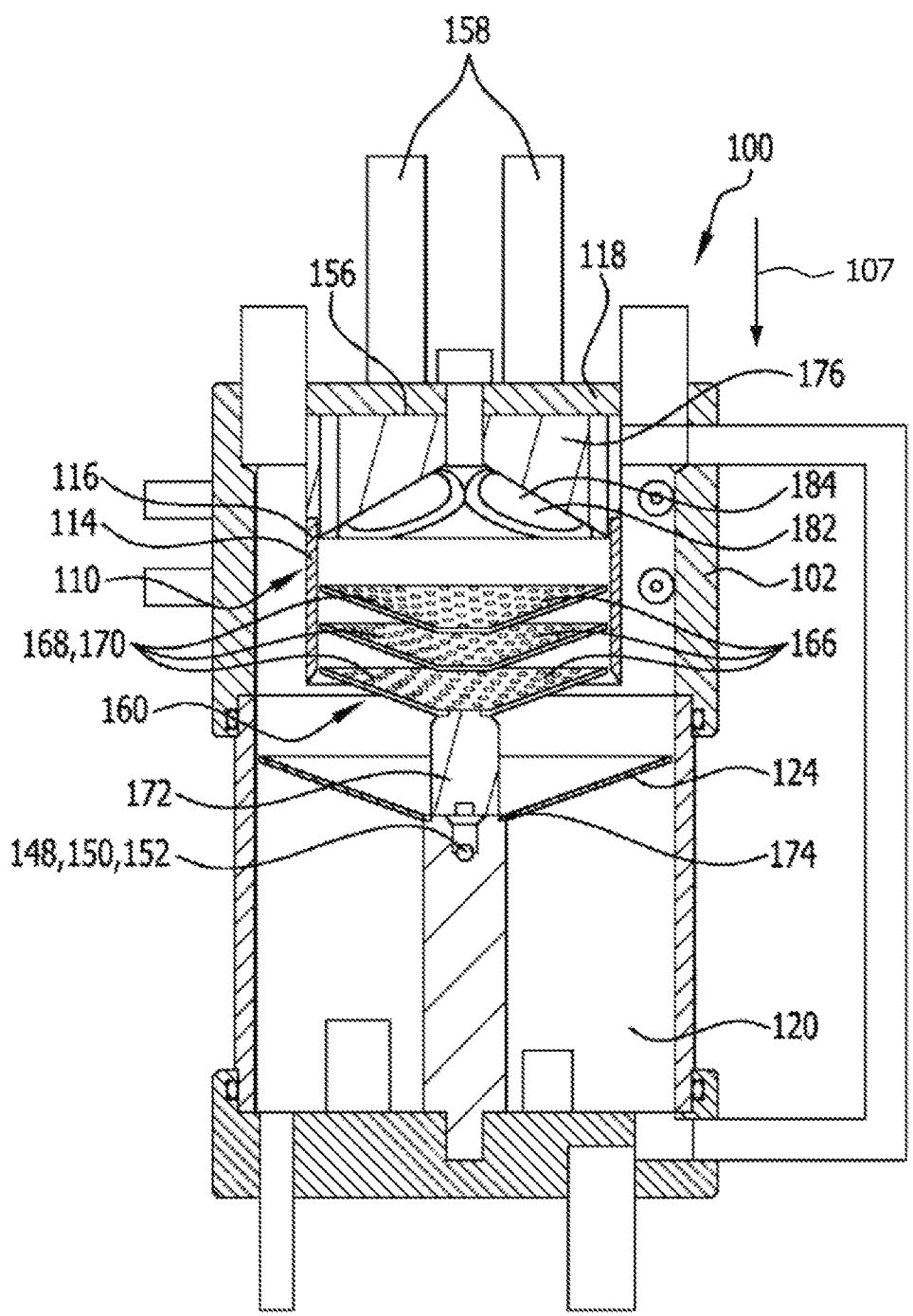
FIG. 6 shows a schematic vertical longitudinal section, corresponding to FIG. 4, through an alternative embodiment of the aerosol device.
Figure 7:
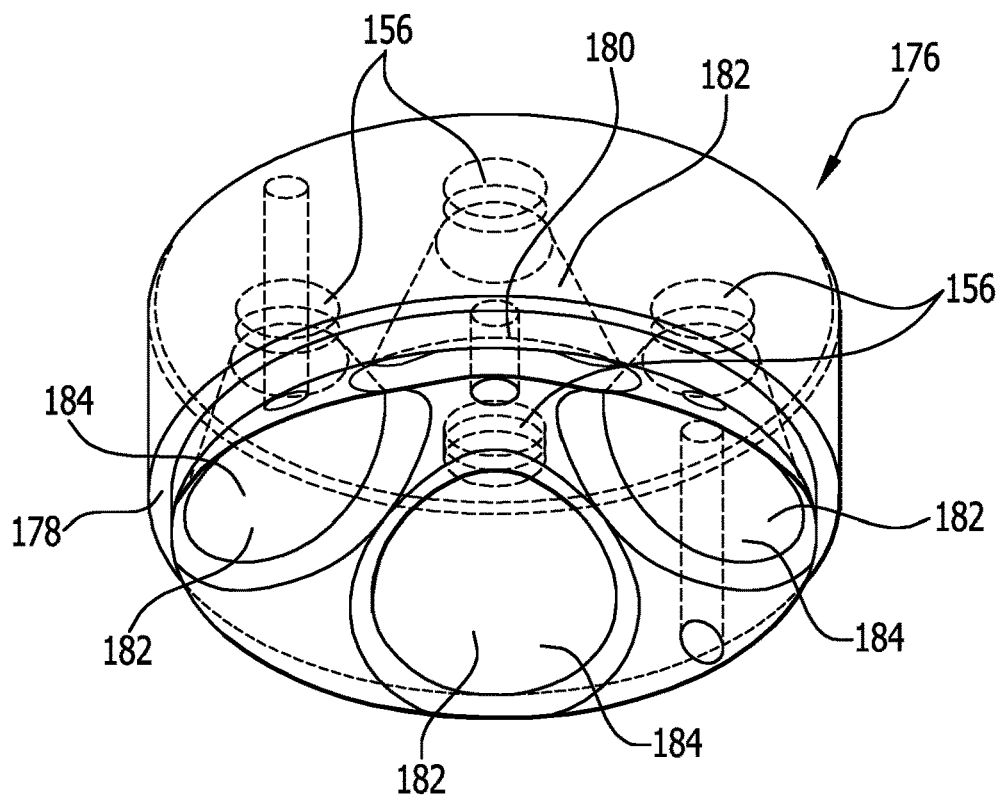
FIG. 7 shows a schematic, partly transparent illustration of a removal element of the aerosol casing.
Figure 8:
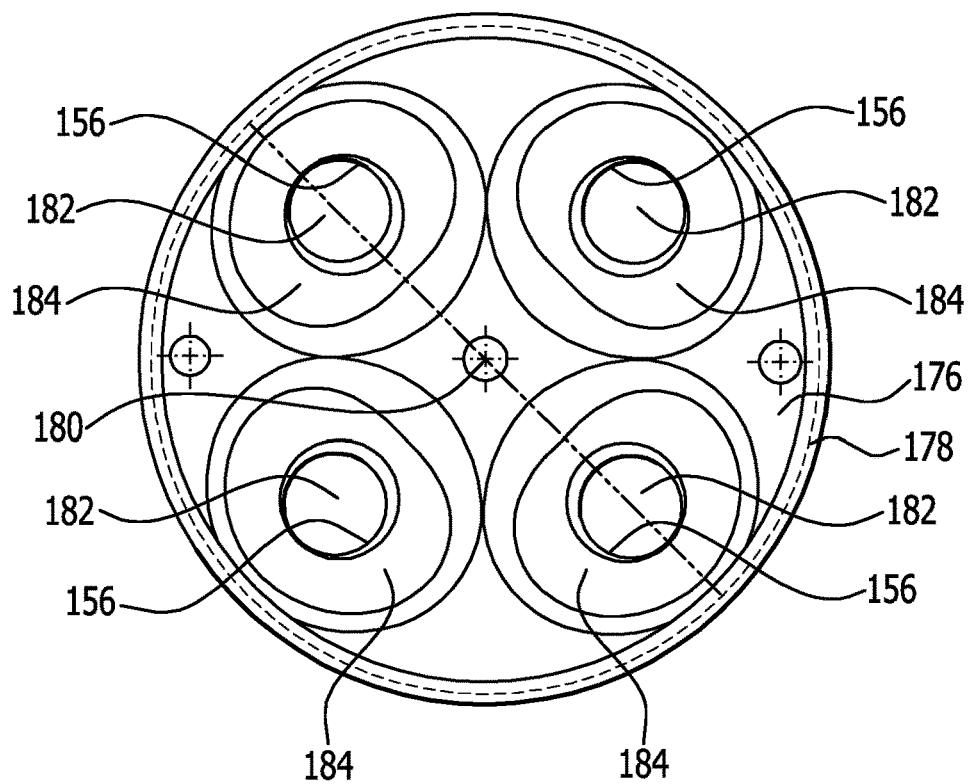
FIG. 8 shows a schematic plan view of an underside of the removal element from FIG. 7.

An alternative embodiment of an aerosol device 100, illustrated in FIGS. 6 to 8, differs from the embodiment illustrated in FIGS. 1 to 5 substantially in that the separating device 160 includes, as an alternative or in addition to the above-mentioned features of the separating device 160 according to the embodiment illustrated in FIGS. 1 to 5, one or more through-flow elements 166.

The through-flow elements 166 are in particular arranged in the interior 106 of the aerosol casing 102 and are preferably surrounded by the dividing wall 114, in particular the dividing cylinder 116.

The through-flow elements 166 are preferably arranged successively, as seen in relation to a direction of flow of the aerosol in the interior 106, such that aerosol flows through the through-flow elements 166 successively.

Each through-flow element 166 takes the form for example of a perforated plate element 168, in particular a perforated metal sheet 170.

Preferably, each through-flow element 166 takes substantially the shape of a cone and/or a truncated cone, wherein a tip (cone tip) preferably points downwards, as seen in the direction of gravity.

The through-flow elements 166 are preferably fixed in the interior 106 and/or are fixed in relation to one another by one or more bearing elements 172.

The through-flow elements 166 preferably have a multiplicity of passage openings through which the aerosol flows, as a result of which ultimately liquid can be separated off.

Suitable selection of the diameters of the perforations preferably results in a desired influence on and/or selection of the (liquid) droplet size distribution.

In the embodiment illustrated in FIGS. 6 to 8, it is further provided for the aerosol chamber base 124 to take substantially the shape of a truncated cone or the outer surface of a truncated cone, wherein a cone tip 174 of the aerosol chamber base 124 preferably points downwards, as seen in the direction of gravity.

Preferably, as a result of the aerosol chamber base 124 a cyclonic action can be generated and/or strengthened within the interior 106 of the aerosol casing 102.

A drainage gap 126 or a drainage opening is in that case preferably arranged at a radially inner region of the aerosol chamber base 124, facing the cone tip 174.

Further, the embodiment of the aerosol device 100 illustrated in FIGS. 6 to 8 differs in respect of alternative guiding away of the aerosol.

In particular, in this case a top wall 118 of the aerosol casing 102 is preferably optimised for flow by one or more additional components or by suitable shaping.

Preferably, the aerosol device 100 includes a removal element 176 by means of which the aerosol can be guided away from the interior 106 of the aerosol casing 102, in particular while avoiding air turbulence and/or flow diversion to the greatest possible extent.

The removal element 176, which is illustrated separately in FIGS. 7 and 8, is for this purpose in particular a substantially cylindrical component that includes a receiving region 178 for receiving the dividing wall 114 and/or can be fixed to the top wall 118 of the aerosol casing 102 by means of one or more securing points 180.

The removal element 176 includes in particular a plurality of funnel-like inflow regions 182, for example four, which are a constituent part of outlet openings 184 for guiding aerosol away from the interior 106.

The outlet openings 184 in particular adjoin carrier duct connection points 156 and/or carrier ducts 158.

Preferably, an outlet opening 184 having a separate inflow region 182 is associated with each carrier duct 158 and/or each carrier duct connection point 156.

The removal element 176 has in particular rounded inflow regions 182, in particular having no edges, corners or other sections that affect flow.

It is thus possible, by means of the inflow regions 182 of the removal element 176, for the aerosol to be guided away from the interior 106 to the carrier ducts 158 with particular efficiency and low turbulence.

The inflow regions 182 may be discharged, on their side facing the interior 106, into a recess in the removal element 176 that is in the shape of a cone portion.

As a result, turbulence or other disturbance of flow may likewise be reduced or completely avoided.

Otherwise, the embodiment of the aerosol device 100 that is illustrated in FIGS. 6 to 8 corresponds, as regards its structure and functioning, to the embodiment illustrated in FIGS. 1 to 5, so in this respect reference is made to the description thereof above.

Figure 9:
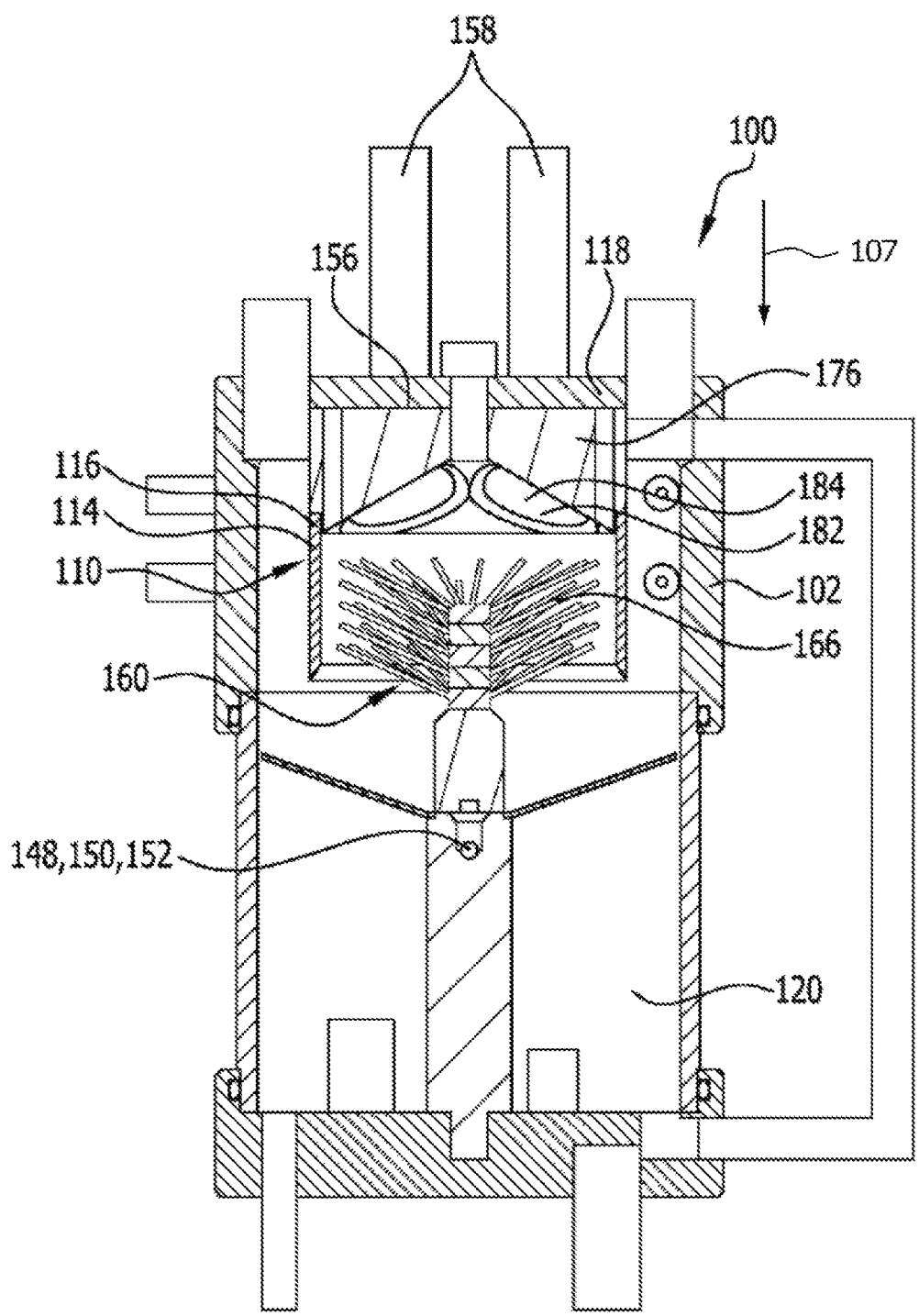
FIG. 9 shows a schematic vertical longitudinal section, corresponding to FIG. 4, through a further alternative embodiment of the aerosol device.

A further alternative embodiment of an aerosol device 100, illustrated in FIG. 9, differs from the embodiment illustrated in FIGS. 6 to 8 substantially in that, instead of perforated plate elements 168, a through-flow element 166 taking the form of a brush-type separator 186 is provided.

The brush-type separator 186 includes in particular a multiplicity of rod-shaped projections connected to one another in particular centrally.

The rod-shaped projections, in particular bristles, are preferably oriented obliquely in relation to the direction of gravity. This preferably enables separated-off liquid to simply flow down. In particular, the liquid flows converging on the centre in the radial direction and along the bearing element 172 for mounting of the brush-type separator 186, down in the direction of the aerosol chamber base 124, and finally into the collecting region 120.

Otherwise, the embodiment of the aerosol device 100 that is illustrated in FIG. 9 corresponds, as regards its structure and functioning, to the embodiment illustrated in FIGS. 6 to 8, so in this respect reference is made to the description thereof above.

In further embodiments (not illustrated), any combinations of features of the aerosol devices 100 described above may be provided.

For example, the brush-type separator 186 from the embodiment according to FIG. 9 may also be provided in the embodiment illustrated in FIGS. 1 to 5.

LIST OF REFERENCE NUMERALS

100 Aerosol device
102 Aerosol casing
104 Aerosol nozzle
106 Interior
108 Outer wall
110 Annular flow region
112 Central region
114 Dividing wall
116 Dividing cylinder
118 Top wall
120 Collecting region
122 Aerosol region
124 Aerosol chamber base
126 Drainage gap
128 Liquid reservoir
130 Liquid conduit
132 Carrier gas source
134 Valve device
136 Aerosol valve
138 Gas conduit
140 Additional gas supply line
142 Proportional valve
144 Manometer
146 Control device
148 Supply device
150 Aerosol nozzle
152 Spray nozzle
154 Wall-supported oil valve
156 Carrier duct connection point
158 Carrier duct
159 Outlet connector
160 Separating device
162 Centrifugal separator
164 Deflecting separator
166 Through-flow element
168 Perforated plate element
170 Perforated metal sheet
172 Bearing element
174 Cone tip
176 Removal element
178 Receiving region
180 Securing point
182 Inflow region
184 Outlet opening
186 Brush-type separator

The invention claimed is:

1. An aerosol device, including:
an aerosol casing;
one or more aerosol nozzles for generating an aerosol stream from a carrier gas and a liquid, wherein the one or more aerosol nozzles are directed into an interior of the aerosol casing and are arranged in the aerosol casing;
one or more carrier duct connection points for connecting one or more carrier ducts, by means of which the aerosol is guidable away from the interior of the aerosol casing, wherein
the interior of the aerosol casing includes an annular flow region and a central region, wherein the annular flow region surrounds the central region in a ring,
the one or more aerosol nozzles are directed into the annular flow region, and wherein the one or more carrier duct connection points directly adjoin the central region,
the annular flow region and the central region are spatially divided from one another by a hollow-cylindrical dividing wall, wherein the aerosol device includes a supply device for supplying an additive to the interior of the aerosol casing, and wherein the supply device is arranged directly below a central region of the interior of the aerosol casing, as seen in the direction of gravity, and directed into the central region.

2. An aerosol device according to claim 1, wherein the aerosol device includes a separating device for separating liquid droplets from the aerosol, wherein the separating device is arranged between the one or more aerosol nozzles on the one hand and the one or more carrier ducts on the other, as seen in a direction of flow of the aerosol.

3. An aerosol device according to claim 2, wherein the separating device includes a centrifugal separator or a deflecting separator.

4. An aerosol device according to claim 2, wherein the separating device includes one or more through-flow elements or a brush-type separator or one or more perforated plate elements.

5. An aerosol device according to claim 1, wherein the interior of the aerosol casing takes an at least approximately rotationally symmetrical form, and/or wherein the one or more aerosol nozzles are directed at least approximately tangentially into the interior such that an aerosol gas stream that rotates in a ring or a spiral or a helix is producible in the interior of the aerosol casing.

6. An aerosol device according to claim 1, wherein the aerosol device includes an additional aerosol nozzle or a spray nozzle for spraying a liquid or a drop generator for the purpose of introducing liquid drops.

7. An aerosol device according to claim 1, wherein the supply device is arranged in an aerosol chamber base that divides an aerosol region of the interior of the aerosol casing that serves to guide aerosol from a collecting region of the interior that serves to receive liquid.

8. An aerosol device according to claim 1, wherein an aerosol chamber base, which downwardly terminates an aerosol region of the interior of the aerosol casing serving to guide aerosol, is in the shape of a cone or a truncated cone, wherein a cone tip of the cone shape or truncated cone shape points downwards.

9. An aerosol device according to claim 1, wherein a plurality of carrier duct connection points and/or carrier ducts have mutually different diameters, such that different aerosol variants having different droplet size distributions are configured to be discharged and/or conveyed.

10. An aerosol device according to claim 1, wherein the aerosol device includes a control device by means of which a droplet size distribution and/or a volumetric flow of the generated and/or provided aerosol is adjustable in targeted manner by:
   a) varying the volumetric flows and/or pressures of the carrier gas and/or the liquid for the one or more aerosol nozzles; and/or
   b) varying a volumetric flow and/or pressure of an additional gas stream that is introduced into the interior in addition to the carrier gas; and/or
   c) varying a volumetric flow and/or pressure of the additive that is additionally supplied by way of the supply device; and/or
   d) selecting individual or a plurality of carrier duct connection points and/or carrier ducts for guiding away the aerosol.

11. An aerosol device according to claim 1, wherein a removal region of the aerosol casing that is adjoined by one or more carrier ducts or includes or forms one or more carrier duct connection points includes one or more funnel-like outlet openings.

* * * * *